(12) United States Patent
Pizano

(10) Patent No.: US 12,025,248 B1
(45) Date of Patent: Jul. 2, 2024

(54) BUSHING SEAL FOR CRUDE OIL DESALTERS

(71) Applicant: Desalters-LLC, Magnolia, TX (US)

(72) Inventor: Francis Robert Pizano, Magnolia, TX (US)

(73) Assignee: DESALTERS-LLC, Magnolia, TX (US)

( * ) Notice: Subject to any disclaimer, the term of this patent is extended or adjusted under 35 U.S.C. 154(b) by 0 days.

(21) Appl. No.: 18/581,064

(22) Filed: Feb. 19, 2024

(51) Int. Cl.
*F16L 23/18* (2006.01)
*H01B 17/26* (2006.01)

(52) U.S. Cl.
CPC .................................. *F16L 23/18* (2013.01)

(58) Field of Classification Search
CPC .. H02G 3/22; H02G 3/24; H02G 3/30; H02G 3/08; H01R 13/622; H01R 13/621; H01R 13/46; H01R 13/52; F16L 23/18; F16L 23/00; F16L 23/16; H01B 17/26; H01B 17/30; H01B 17/00
USPC ............ 174/650, 652, 653, 654, 135, 152 G, 174/153 G, 152 R; 248/68.1, 49, 74.1, 248/74.2; 16/2.1, 2.2
See application file for complete search history.

(56) References Cited

U.S. PATENT DOCUMENTS

| | | | | |
|---|---|---|---|---|
| 3,972,015 A * | 7/1976 | Mikulecky | ........... | H01B 17/005 337/186 |
| 4,308,420 A * | 12/1981 | Scott | ............ | H01B 17/54 174/18 |
| 4,767,351 A * | 8/1988 | Patel | ............ | H01R 13/53 174/152 R |
| 4,791,247 A * | 12/1988 | Cacalloro | ............ | H01B 17/22 156/330 |
| 5,483,023 A * | 1/1996 | Barnes | ............ | H01B 17/265 174/152 R |
| 6,787,704 B2 * | 9/2004 | Owen | ............ | H01F 27/04 174/152 G |
| 10,446,973 B2 * | 10/2019 | Lewin | ............ | H01R 43/20 |

* cited by examiner

*Primary Examiner* — Angel R Estrada
(74) *Attorney, Agent, or Firm* — Nicholas Pfiefer; Smith & Hopen, P. A.

(57) ABSTRACT

A method and assembly for improving and maintaining a seal between an insulating rod and a flange in a desalter entrance bushing assembly. The assembly includes an insulating rod with a shoulder for a biasing component, a hub nut with a spring seat for a biasing component, a biasing component, and a flange to which the insulating rod can create a fluid tight seal. The shoulder and spring seat can form approximately 90-degree platforms on which the biasing component can apply force when the hub nut is appropriately secured to the flange. The method includes threading the hub nut containing the biasing component into the flange. The nut is secured to a predetermined torque and the biasing component ensures that the seal is maintained during temperature and pressure fluctuations.

16 Claims, 9 Drawing Sheets

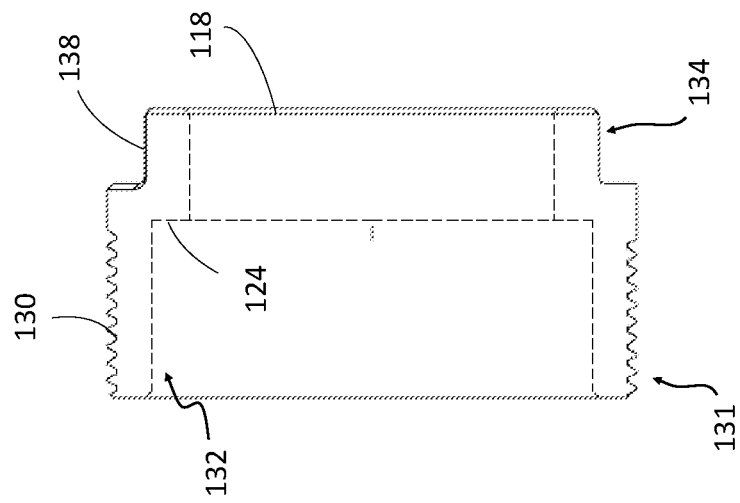
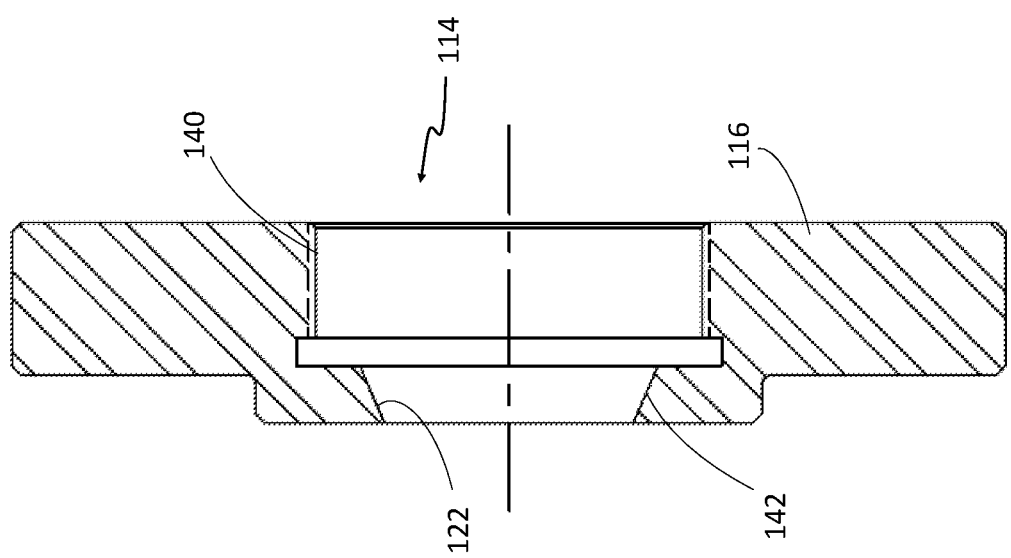

BUSHING SEAL FOR CRUDE OIL DESALTERS

BACKGROUND OF THE INVENTION

1. Field of the Invention

This invention relates, generally, to desalters. More specifically, it relates to seals for desalters.

2. Brief Description of the Prior Art

Oil refineries around the world rely on crude oil desalters. Desalters include entrance bushings to help regulate the flow of crude oil and other feedstock into the desalting unit, ensuring a consistent and controlled process. These bushings facilitate the mixing of crude oil with desalting chemicals, such as water, to remove impurities, salts, and contaminants effectively. Importantly, entrance bushings must be configured to allow for the transmission of roughly 23,000 Volts while also simultaneously maintaining a tight internal and external seal.

Current desalter entrance bushings 10, such as those exemplified in FIGS. 1, include a mechanical seal to keep crude oil from contaminating the mineral oil in high voltage transformers. To do so, entrance bushings 10 include conductor rod 11 passing through insulating rod 12. Insulating rod 12 passes through aperture 14 in flange 16, which is secured to an entrance in the desalter. Aperture 14 in flange 16 is threaded and hub nut 18 includes thread 30, which is configured to threadedly engage flange aperture 14. As hub nut 18 is threaded towards flange 16, arcuate interface 24 on hub nut 18 contacts a corresponding arcuate shoulder 26 on insulating rod 12. Through this contact, hub nut 18 forces tapered sealing surface 20 of insulating rod 12 into an interference fit with a tapered sealing surface 22 of flange 16. Hub nut 18 is threaded into flange aperture 14 to a specified torque in accordance with industry standards.

Unfortunately, desalter entrance bushings will eventually fail and need to be replaced. The failure stems from the use of the mechanical seal between insulator rod 12 and flange 16. Typically, entrance bushings are exposed to oil under high pressure and high temperature. When there is an upset in production, the oil pressure and temperature drop. The seal fails because the respective sealing surfaces 20, 22 of insulating rod 12 and flange 16 eventually loosen as a result of the fluctuation in pressure and temperature.

The seal of these bushings can also fail if insulating rod 12 is installed when rod 12 is relatively cold compared to its operational temperature. Typical insulating rods 12 are comprised of PTFE Teflon or similar material. If these materials are not sufficiently heated, the sealing surfaces 20 will not sufficiently compress as hub nut 18 is torqued into flange aperture 14. The failure to sufficiently compress the sealing surfaces also contributes to the seal eventually failing during temperature and pressure fluctuations.

Accordingly, what is needed is an improved method and system for sealing a desalter entrance bushing. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved method and system for sealing a desalter entrance bushing is now met by a new, useful, and nonobvious invention.

The novel structure includes a desalter entrance bushing assembly, comprising an insulating rod, a biasing component, a hub nut, and a flange. The insulating rod has a tapered sealing surface residing between a proximal end and a distal end and a shoulder proximally located relative to the tapered sealing surface. The shoulder has a diameter greater than the diameter of an adjacent proximal section of the insulating rod. In some embodiments an angle is established by the shoulder of the insulating rod and the adjacent proximal section of the insulating rod that is approximately 90 degrees.

The biasing component has a through hole with an inner diameter smaller than the shoulder of the insulating rod and larger than the diameter of the proximal section of the insulating rod adjacent to the shoulder. In some embodiments, the biasing component is configured to provide a force of at least 350 PSI to the shoulder of the insulating rod when the hub nut is tightened to the flange under a predetermined toque of at least 50 ft/lb.

The hub nut includes a thread disposed on an external surface of the hub nut, a through hole configured to receive at least a portion of the insulating rod, a spring receiving area within the through hole, and a spring seat extending inwardly within the through hole. The spring seat provides a platform for engaging the biasing component. In some embodiments, an angle is established by spring seat and an internal surface of the hub nut that is approximately 90 degrees. In some embodiments, the distance between the spring seat and the distal starting position of the thread on the hub nut is greater than the longitudinal extent of the biasing component when the biasing component is in a fully compressed configuration.

The flange has a central aperture. The central aperture includes a threaded proximal portion configured to threadedly receive the thread on the hub nut and a tapered sealing surface complimentary to the sealing surface of the insulating rod.

When the hub nut is threaded into the flange, the biasing component applies an additional force to maintain a seal between the sealing surface of the insulating rod and the sealing surface of the flange. The force is at least approximately 350 PSI when the hub nut is tightened to the flange under a predetermined toque of at least approximately 50 ft/lb.

The method of the present invention comprises creating and maintaining a seal between an insulating rod and a flange in a desalter entrance bushing assembly. The method includes providing the insulating rod, hub nut, biasing component, and flange. The insulating rod includes a tapered sealing surface residing between a proximal end and a distal end and a shoulder proximally located relative to the tapered sealing surface. In some embodiments, the angle established by the shoulder of the insulating rod and the adjacent proximal section of the insulating rod is approximately 90 degrees.

The hub nut includes a thread disposed on an external surface of the hub nut, a through hole configured to receive at least a portion of the insulating rod, and a spring seat extending inwardly within the through hole. In some embodiments, the angle established by the spring seat and an internal surface of the hub nut is approximately 90 degrees.

The biasing component is configured to reside at least partially within the hub nut. In some embodiments, the distance between the spring seat and the distal starting position of the thread on the hub nut is greater than the longitudinal extent of the biasing component when the biasing component is in a fully compressed configuration.

The method further includes inserting the insulating rod into a central aperture in the flange until the sealing surface of the insulating rod contacts a complimentary sealing surface of the flange. The hub nut, with the biasing component residing within the through hole in the hub nut, is then threaded into the central aperture in the flange. As a result, the biasing component contacts both the spring seat in the hub nut and the shoulder on the insulating rod when the hub nut. The hub nut is secured into the central aperture in the flange to a predetermined torque In some embodiments, the biasing component is configured to provide a force of at least 350 PSI to the shoulder of the insulating rod when the hub nut is tightened to the predetermined toque. In some embodiments, the predetermined toque is at least 50 ft/lb.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 7 is a close-up cross-sectional view of an embodiment of the hub nut.

FIG. 8 is a close-up cross-sectional view of an embodiment of the flange. It should be noted that the internal thread in the central aperture is not depicted to improve clarity of the figure.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

It is to be understood, even if it is not always explicitly stated that all numerical designations are preceded by the term "about" or "approximately." As used herein, "about" or "approximately" refers to being within an acceptable error range for the particular value as determined by one of ordinary skill in the art, which will depend in part on how the value is measured or determined. For example, the term "about" or "approximately" may refer to ±10% of the numerical or within a range that is generally deemed equivalent within the field of the invention.

Figure 1A:
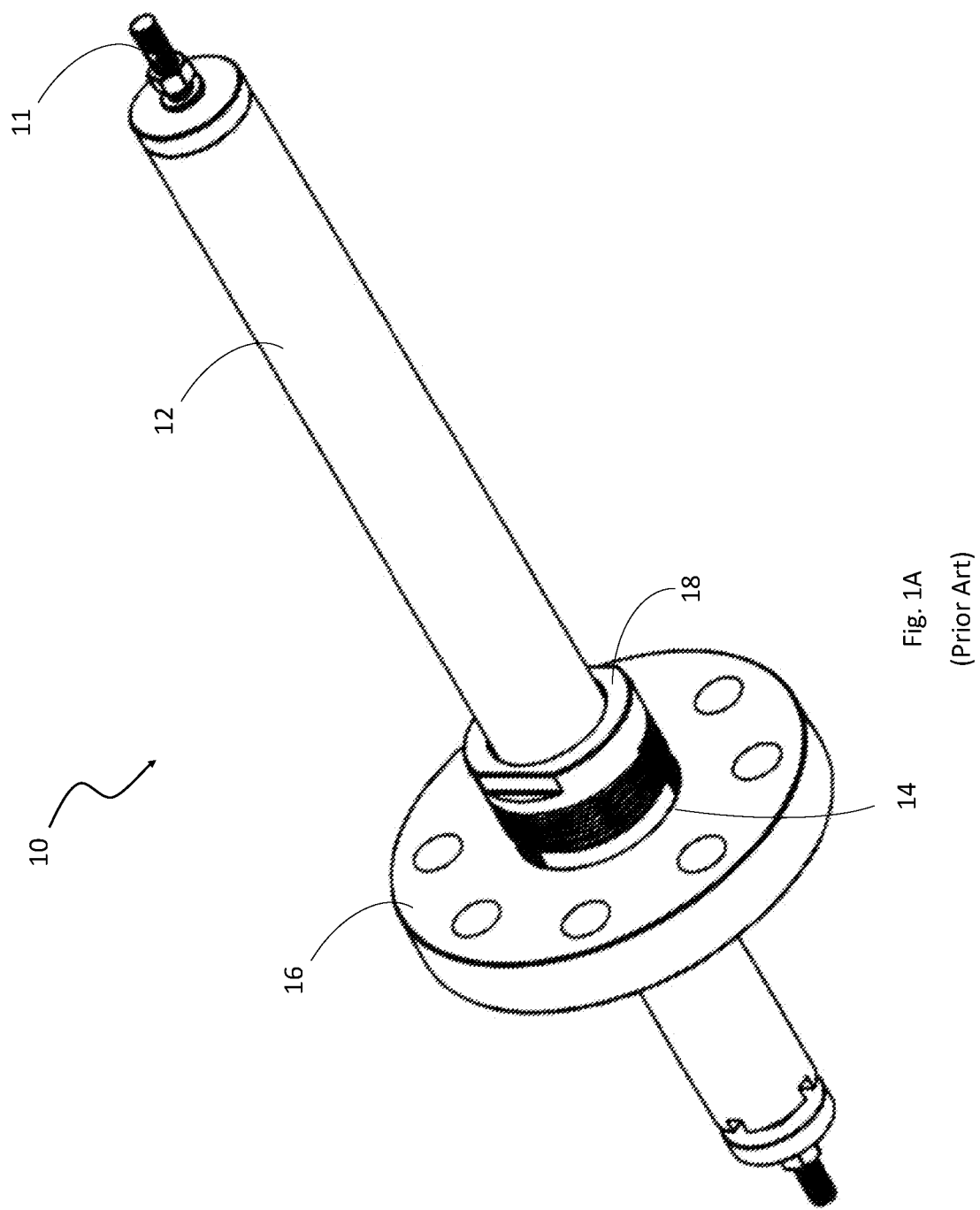
FIG. 1A is a perspective view of a prior art desalter entrance bushing.
Figure 1B:
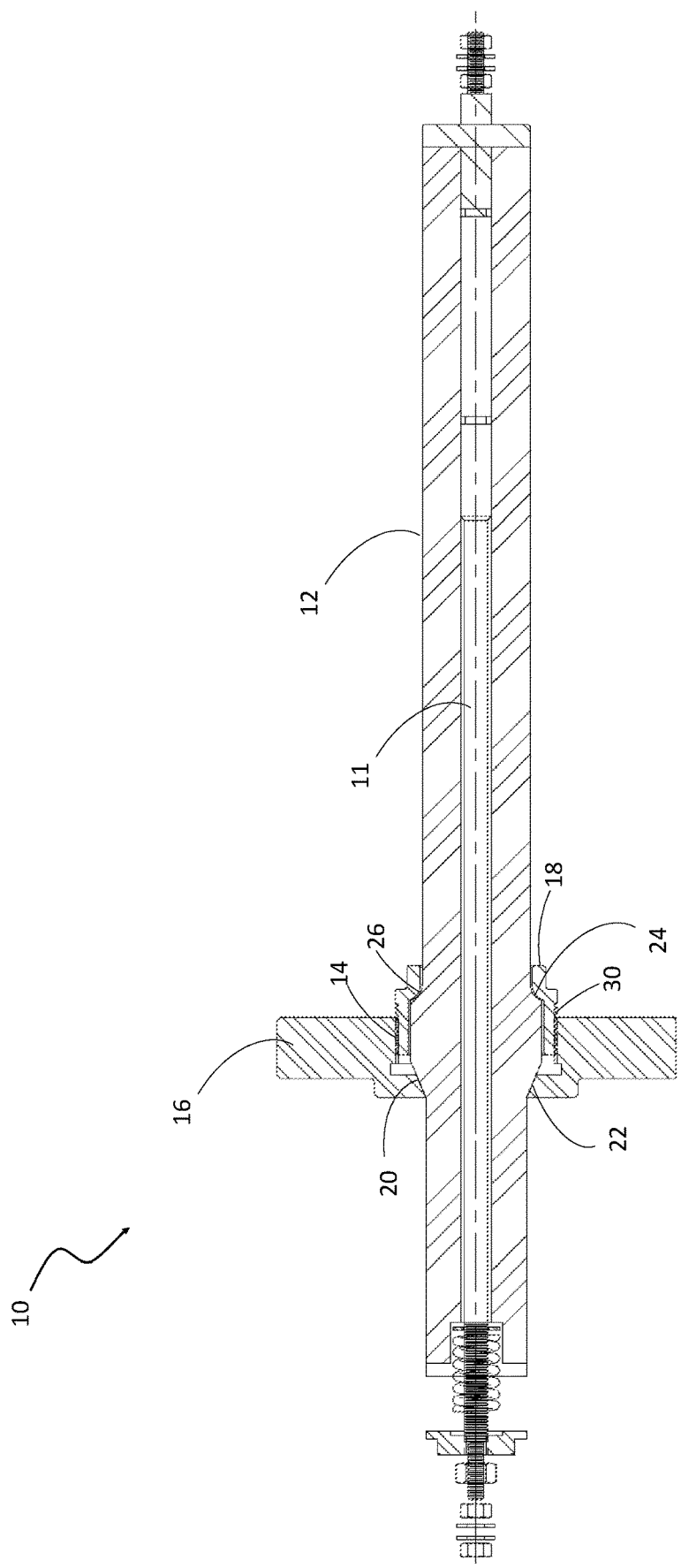
FIG. 1B is a cross-sectional view of a prior art desalter entrance bushing.
Figure 1C:
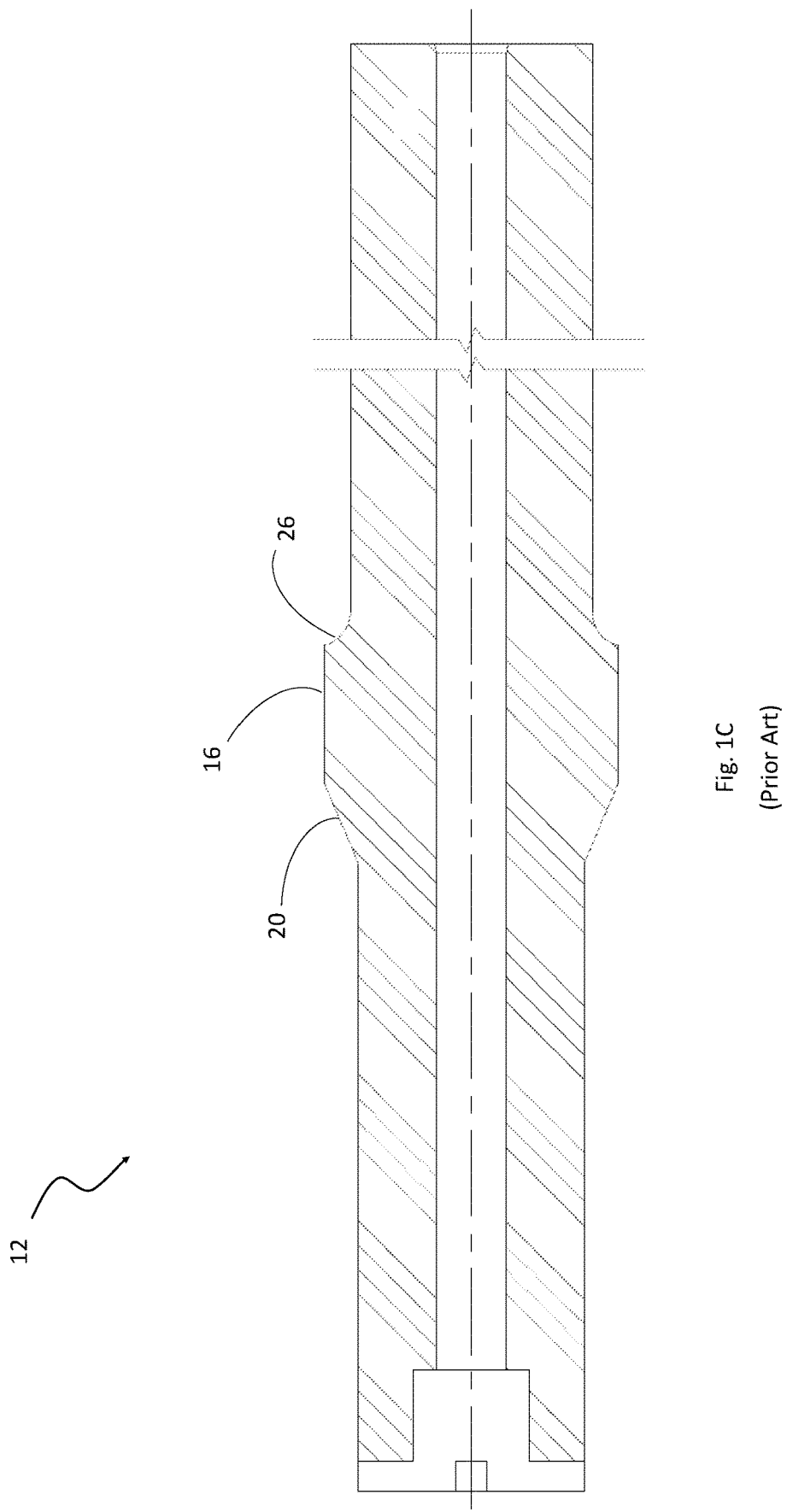
FIG. 1C is a close-up cross-sectional view of a prior art insulating rod.
Figure 1D:
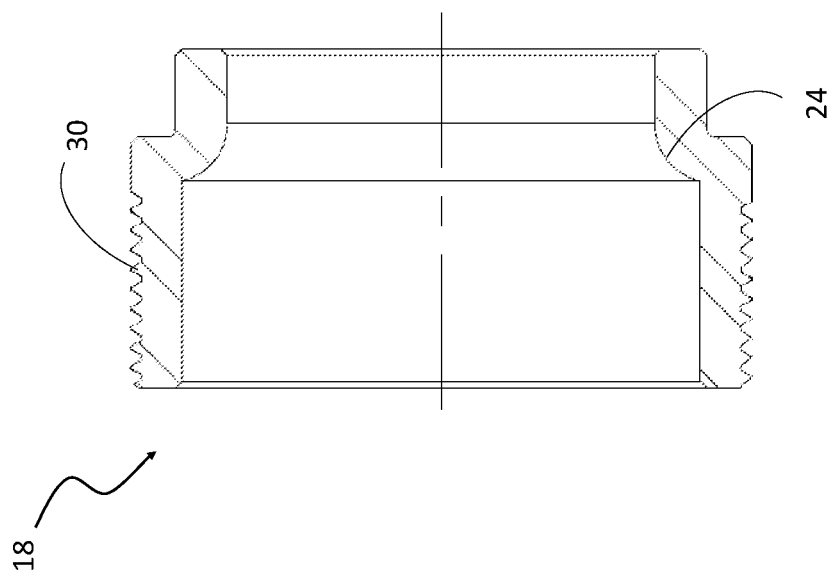
FIG. 1D is cross-sectional view of a prior art hub nut used to secure the insulating rod to the flange.
Figure 2:
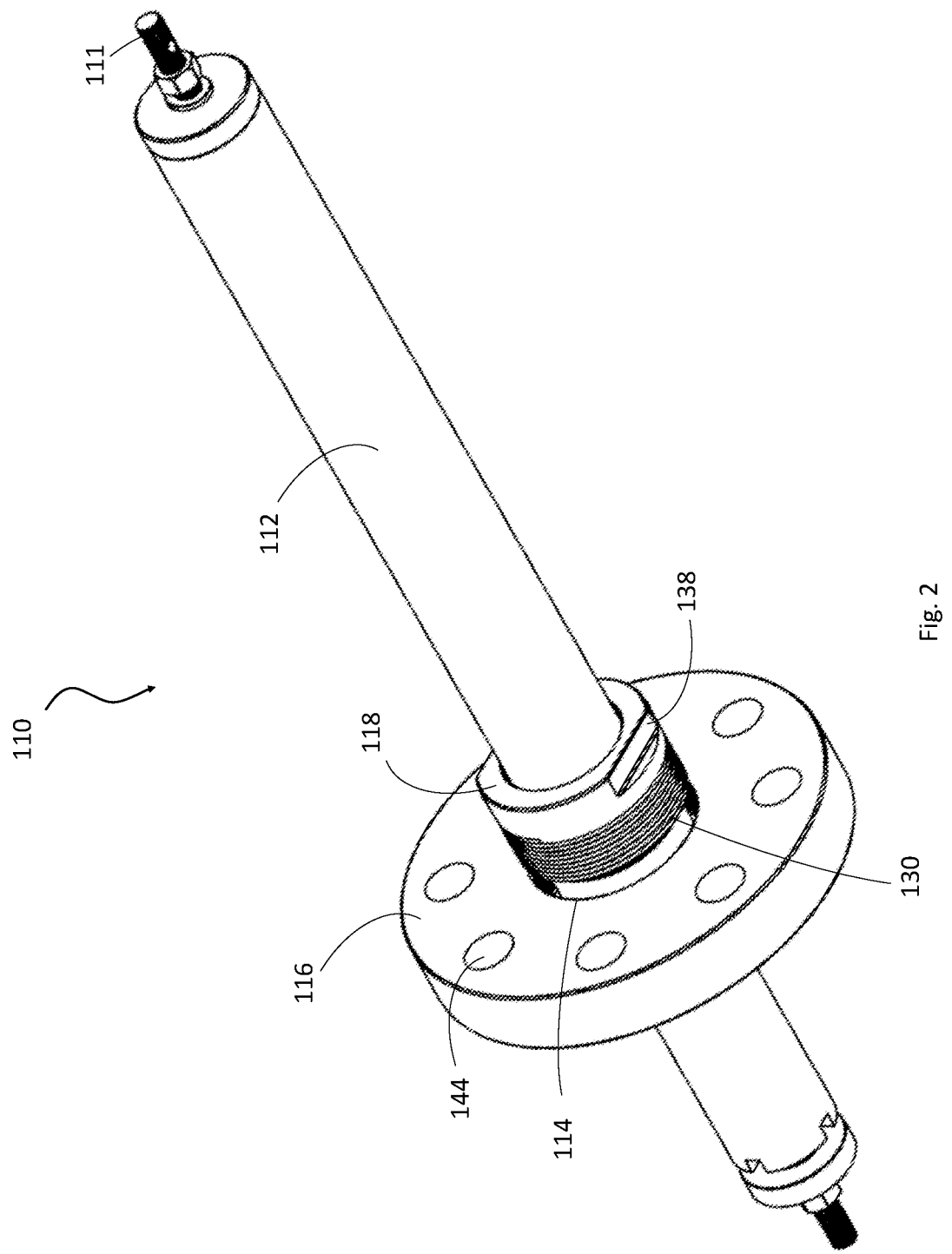
FIG. 2 is a perspective view of an embodiment of the present invention.
Figure 3:
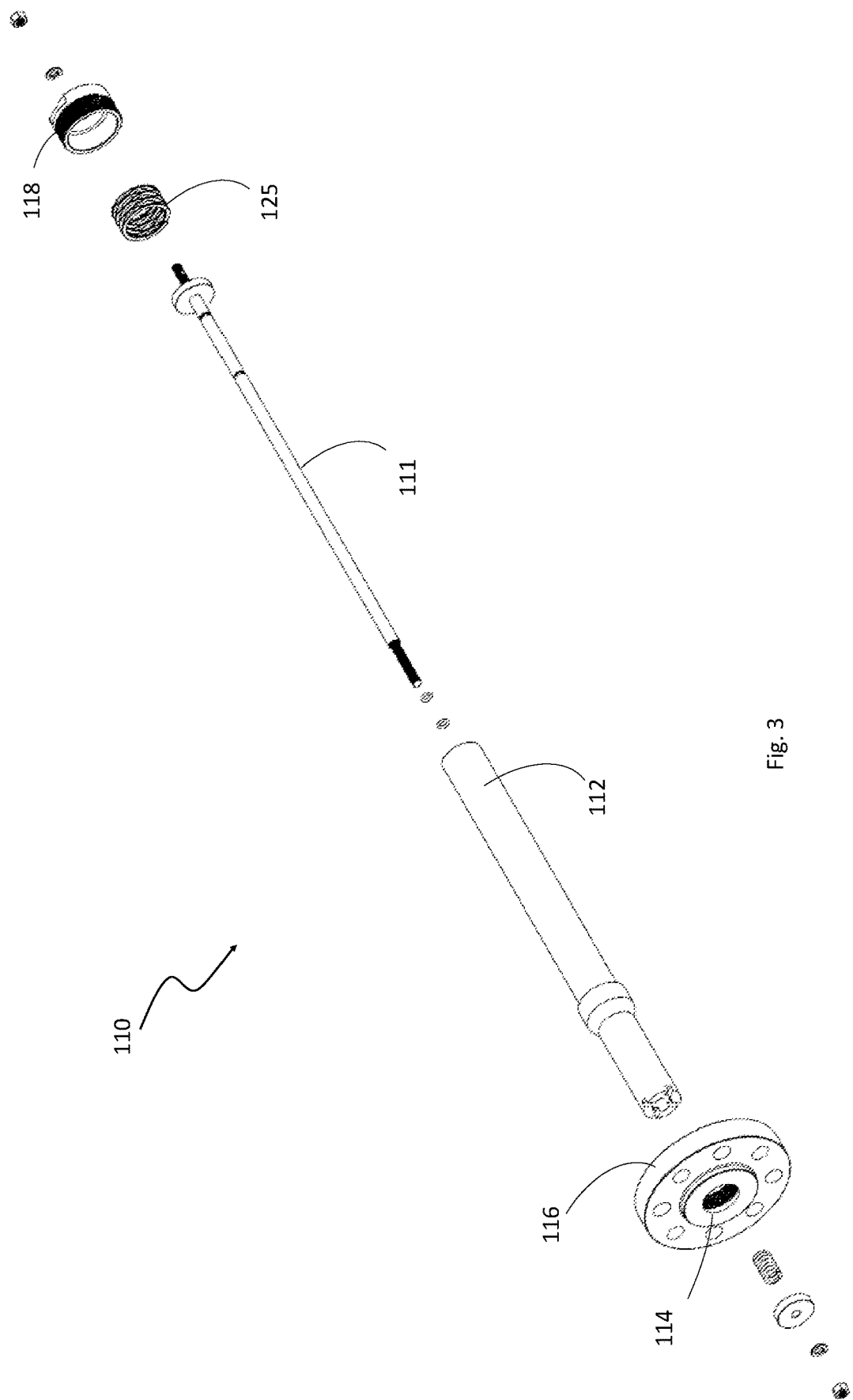
FIG. 3 is an exploded view of an embodiment of the present invention.
Figure 4:
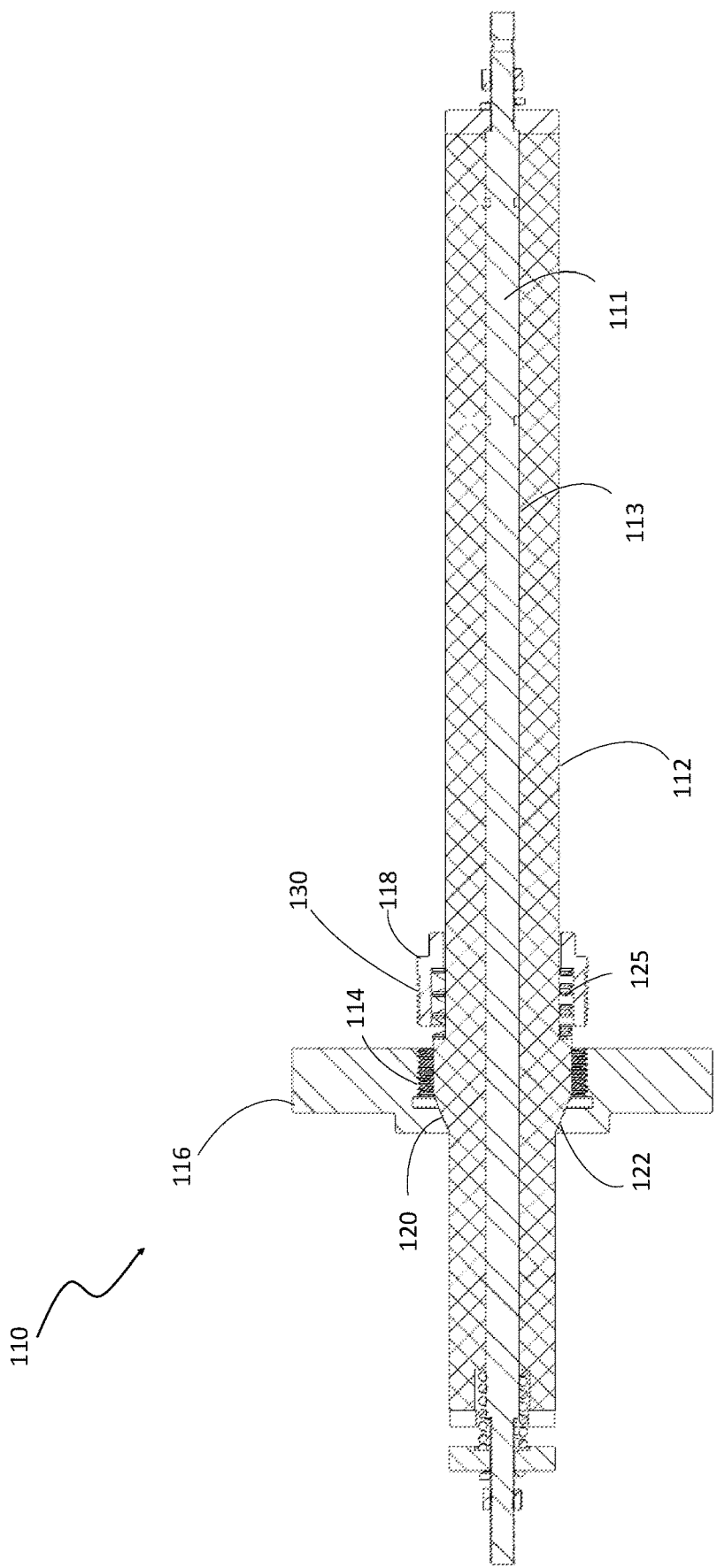
FIG. 4 is a cross-sectional view of an embodiment of the present invention.

The present invention includes a system and method for improving and maintaining the seal between an insulating rod and a flange of a desalter entrance bushing. Referring now to FIGS. 2-4, the system of the present invention includes desalter entrance bushing assembly 110. Bushing assembly 110 includes insulating rod 112, flange 116, hub nut 118, and biasing component 124. In some embodiments, bushing assembly 110 further includes conducting rod 111, which is secured within an internal channel 113 of insulating rod 112.

The inclusion of biasing component 125 is configured to apply a spring force onto insulating rod 112 to further compress tapered sealing surface 120 of insulating rod 112 into an interference fit with a tapered sealing surface 122 of flange 116. Thus, biasing component 125 prevents the failure of the seal between sealing surfaces 120 and 122 that would typically occur.

In some embodiments, the sealing surfaces 120 and 122 of insulating rod 112 and flange 116, respectively, remain generally unchanged in comparison to prior art assemblies 10. However, the degree of taper of each sealing surface 120 and 122 can be modified so long as the degree of taper are complimentary to create a seal through an interference fit. Moreover, sealing surfaces 120 and 122 can have alternatively shaped surfaces so long as they are complimentary to create a seal through an interference fit.

To ensure a sufficient interference fit, insulating rod, or at least sealing surface 120 is comprised of a material sufficient to create an interference fit with flange 116. In some embodiments, the material is sufficiently compressible to create an interference fit with flange 116. A non-limiting example is PTFE Teflon. In addition, or alternatively, flange 116, or at least sealing surface 122, is comprised of a material sufficient to create an interference fit with insulating rod 112. In some embodiments, the material is sufficiently compressible to create an interference fit with insulating rod 112.

Figure 5:
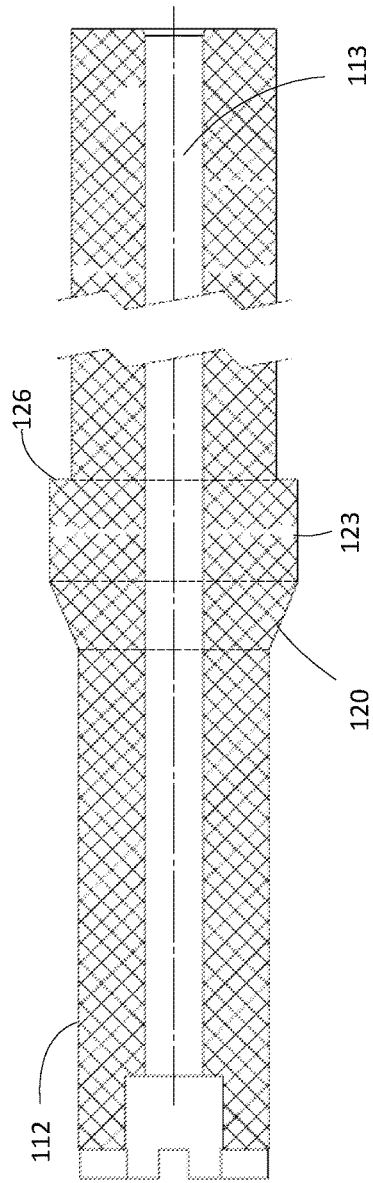
FIG. 5 is a close-up cross-sectional view of an embodiment of the insulating rod.

As best depicted in FIGS. 3-5, insulating rod 112 includes tapered sealing surface 120 transitioning to annular extension 123 and to shoulder 126 moving in a proximal direction. Shoulder 126 could be separated from sealing surface 120 rather than being integrated through annular extension 123. In addition, shoulder 126 can extend fully around the circumference of insulating rod 112 or partially around the circumference of insulating rod 112, thereby establishing a series of discontinuous semi-circular arcs extending about the circumference of insulating rod 112.

As best depicted in FIG. 5, shoulder 126 establishes a generally 90-degree angle with the outer surface of insulating rod 112. In some embodiments, shoulder 126 establishes an angle with the outer surface of insulating rod 112 that is less than 90 degrees, but sufficient to retain biasing component 125 on shoulder 126 when biasing component 125 is compressed. In some embodiments, shoulder 126 establishes an angle with the outer surface of insulating rod 112 that is sufficient to retain biasing component 125 on shoulder 126 when biasing component 125 is compressed.

Shoulder 126 has a lateral expanse sufficient to function as a platform for biasing component 125 as depicted in FIG. 4. In some embodiments, the lateral expanse, i.e., the outer diameter of shoulder 126 is equal to or greater than the outer diameter of biasing component 125.

Figure 6:
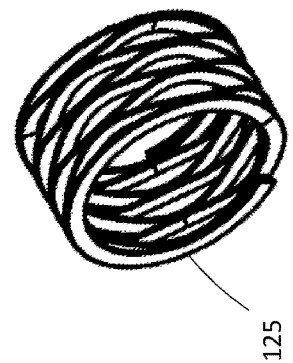
FIG. 6 is a close-up perspective view of an embodiment of the biasing component.

As shown in FIG. 6, biasing component 125 has a generally annular cross-sectional shape with an inner diameter large enough to accommodate insulating rod 112. However, biasing components with alternative cross-sectional shapes can be used so long as the biasing component can fit between the outer surface of insulating rod 112 and the inner surface of hub nut 118.

In some embodiments, biasing component 125 is a flat coil spring. However, alternative spring designs can be used. Biasing component 125 is configured to apply a force of at least approximately 350 PSI to shoulder 126 when hub nut 118 is tightened to flange 116 under a predetermined toque of approximately 50 ft/lb.

Referring now to FIGS. 4 and 7, hub nut 118 has distal section 131 and proximal section 134. Distal section 131 an internal diameter greater than or equal to the outer diameter of biasing component 125 thereby establishing a spring receiving area 132 within hub nut 118.

Distal section 131 further includes a length extending from spring seat 124 towards distal end 119 of hub nut 118. The length of spring receiving area 132 is sufficiently long to accommodate biasing component 125 in a fully compressed configuration and allow thread 130 of hub nut 118 to engage threaded aperture 114 in flange 116. Put another way, the distance between spring seat 124 and the distal starting position of thread 130 is greater than the longitudinal extent of biasing component 125 when in a fully compressed configuration.

Seat 124 effectively separates distal section 131 from proximal section 134. As depicted, seat 124 extends fully around the internal circumference of spring receiving area 132. However, seat 124 can extend partially around the internal circumference of spring receiving area 132, thereby establishing a series of discontinuous semi-circular arcs extending about the internal circumference of spring receiving area 132.

Seat 124 establishes an angle of approximately 90 degrees with the inner surface of distal section 131 of hub nut 118. In some embodiments, seat 124 establishes an angle with the inner surface of distal section 131 of hub nut 118 that is less than 90 degrees, but sufficient to retain biasing component 125 on seat 124 when biasing component 125 is compressed. In some embodiments, the angle is sufficient to retain biasing component 125 on seat 124 when biasing component 125 is compressed.

Seat 124 has an inward lateral expanse sufficient to function as a platform for biasing component 125 as depicted in FIG. 4. In some embodiments, the inward lateral expanse is equal to or greater than the difference between the inner radius and outer radius of biasing component 125.

Moving proximally from seat 124, proximal section 134 of hub nut 118 has an inner diameter approximately equal to or slightly larger than the outer diameter of insulating rod 112. The clearance between the inner diameter of hub nut 118 at proximal section 134 is less than the difference between the inner radius and outer radius of biasing component 125. The minimal clearance ensures that biasing component 125 does not pass between insulating rod 112 and hub nut 118.

As previously noted, hub nut 118 further includes thread 130 on the external surface of hub nut 118. In some embodiments, thread 130 is proximate distal end 119 and extends towards proximal section 134. In some embodiments, thread 130 extends generally along the majority or the entire length of distal section 131. Thread 130 is configured to engage the threaded receipt 114 in flange 116.

Hub nut 118 further includes tool engageable surfaces 138 proximate proximal end. The tool engageable surfaces may include one or more planar surfaces to allow a user to grasp hub nut 118 with a tool such as a pair of pliers, a wrench, socket, etc. Tool engageable surfaces 138 can be planar surfaces arranged about the circumference of the outer surface of hub nut 118.

Flange 116 includes central aperture 114 for receiving insulating rod 112 and at least a portion of hub nut 118. Aperture 114 includes proximal portion 140 sized to receive hub nut 118 and distal portion 142 configured to create a seal with insulating rod 112. Distal portion 142 includes sealing surface 122. Sealing surface 122 tapers inwardly moving in a distal direction and has a size and shape complimentary to sealing surface 120 on insulating rod 112 to create a fluid tight seal. While sealing surface 122 is depicted as a tapered annular shape, alternative shapes can be used so long as the shape is complimentary to sealing surface 120 such that a fluid tight seal can be created.

Proximal portion 140 has an inner diameter that is sized to accommodate hub nut 118 with biasing component 125 residing within hub nut 118. Thus, the inner diameter of proximal portion 140 is equal to or slightly larger than the outer diameter of hub nut 118. In addition, proximal portion 140 of aperture 114 is threaded such that thread 130 on hub nut 118 can threadedly engage aperture 114. In some embodiments, threaded proximal portion 140 has a length that is equal to or greater than the longitudinal expanse of thread 130 along the longitudinal axis of hub nut 118.

Flange 116 further includes a sealing surface 122 located distally from thread receipt. As previously noted, the sealing surface 122 has a shape complimentary to sealing surface 120 of insulating rod 112 and a material sufficient to create the seal, such as a compressible material.

As best depicted in FIGS. 2-3, flange 116 further includes a series of apertures 144 for receiving bolts (not shown) that secure flange 116 to the desalter. Apertures 144 may be equidistantly spaced around aperture 114.

The method of the present invention comprises creating and maintaining a seal between an insulating rod and a flange in a desalter entrance bushing assembly. The method includes providing the insulating rod, hub nut, biasing component, and flange. Said provided components are in accordance with any of the embodiments described above.

The method further includes inserting the insulating rod into the central aperture in the flange until the sealing surface of the insulating rod contacts the complimentary sealing surface of the flange. The hub nut, with the biasing component residing within the through hole in the hub nut, is then threaded into the central aperture in the flange. As a result, the biasing component contacts both the spring seat in the hub nut and the shoulder on the insulating rod when the hub nut. The hub nut is secured into the central aperture in the flange to a predetermined torque In some embodiments, the biasing component is configured to provide a force of at least 350 PSI to the shoulder of the insulating rod when the hub nut is tightened to the predetermined toque. In some embodiments, the predetermined toque is at least 50 ft/lb.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A desalter entrance bushing assembly, comprising:
   an insulating rod, the insulating rod including:
      a tapered sealing surface residing between a proximal end and a distal end;
      a shoulder, wherein the shoulder is proximally located relative to the tapered sealing surface and has a diameter greater than a diameter of an adjacent proximal section of the insulating rod;
   a biasing component having a through hole with an inner diameter smaller than the shoulder of the insulating rod and larger than the diameter of the proximal section of the insulating rod adjacent to the shoulder;
   a hub nut, the hub nut including:
      a thread disposed on an external surface of the hub nut;
      a through hole configured to receive at least a portion of the insulating rod;
      a spring receiving area within the through hole;
      a spring seat extending inwardly within the through hole, wherein the spring seat provides a platform for engaging the biasing component;
   a flange with a central aperture, wherein the central aperture includes:
      a threaded proximal portion configured to threadedly receive the thread on the hub nut;
      a tapered sealing surface complimentary to the sealing surface of the insulating rod;
   wherein the biasing component applies an additional force to maintain a seal between the sealing surface of the insulating rod and the sealing surface of the flange when the hub nut is threaded into the flange.

2. The assembly of claim 1, wherein an angle established by the shoulder of the insulating rod and the adjacent proximal section of the insulating rod is approximately 90 degrees.

3. The assembly of claim 1, wherein an angle established by spring seat and an internal surface of the hub nut is approximately 90 degrees.

4. The assembly of claim 1, wherein the biasing component is configured to provide a force of at least 350 PSI to the shoulder of the insulating rod when the hub nut is tightened to the flange under a predetermined toque of at least 50 ft/lb.

5. The assembly of claim 1, wherein a distance between the spring seat and a distal starting position of the thread on the hub nut is greater than a longitudinal extent of the biasing component when the biasing component is in a fully compressed configuration.

6. A desalter entrance bushing assembly, comprising:
   an insulating rod, the insulating rod including:
      a tapered sealing surface residing between a proximal end and a distal end;
      a shoulder, wherein the shoulder is proximally located relative to the tapered sealing surface;
   a hub nut, the hub nut including:
      a thread disposed on an external surface of the hub nut;
      a through hole configured to receive at least a portion of the insulating rod;
      a spring seat extending inwardly within the through hole;
   a flange with a central aperture, wherein the central aperture includes:
      a threaded proximal portion configured to threadedly receive the thread on the hub nut;
      a tapered sealing surface complimentary to the sealing surface of the insulating rod;
   a biasing component configured to reside at least partially within the hub nut, wherein the biasing component contacts both the spring seat in the hub nut and the shoulder on the insulating rod when the hub nut is threaded into the central aperture of the flange;
   wherein the biasing component applies an additional force to maintain a seal between the sealing surface of the insulating rod and the sealing surface of the flange when the hub nut is threaded into the flange.

7. The assembly of claim 6, wherein an angle established by the shoulder of the insulating rod and the adjacent proximal section of the insulating rod is approximately 90 degrees.

8. The assembly of claim 6, wherein an angle established by spring seat and an internal surface of the hub nut is approximately 90 degrees.

9. The assembly of claim 6, wherein the biasing component is configured to provide a force of at least 350 PSI to the shoulder of the insulating rod when the hub nut is tightened to the flange under a predetermined toque of at least 50 ft/lb.

10. The assembly of claim 6, wherein a distance between the spring seat and a distal starting position of the thread on the hub nut is greater than a longitudinal extent of the biasing component when the biasing component is in a fully compressed configuration.

11. A method of maintaining a seal between an insulating rod and a flange in a desalter entrance bushing assembly, comprising:
- providing the insulating rod, wherein the insulating rod includes:
  - a tapered sealing surface residing between a proximal end and a distal end;
  - a shoulder, wherein the shoulder is proximally located relative to the tapered sealing surface;
- providing a hub nut, wherein the hub nut includes:
  - a thread disposed on an external surface of the hub nut;
  - a through hole configured to receive at least a portion of the insulating rod;
  - a spring seat extending inwardly within the through hole;
- providing a biasing component, wherein the biasing component is configured to reside at least partially within the hub nut;
- inserting the insulating rod into a central aperture in the flange until the sealing surface of the insulating rod contacts a complimentary sealing surface of the flange;
- threading the hub nut into the central aperture in the flange, wherein the hub nut includes the biasing component within the through hole in the hub nut and the biasing component contacts both the spring seat in the hub nut and the shoulder on the insulating rod when the hub nut; and
- securing the hub nut into the central aperture in the flange to a predetermined torque.

12. The method of claim 11, wherein an angle established by the shoulder of the insulating rod and the adjacent proximal section of the insulating rod is approximately 90 degrees.

13. The method of claim 11, wherein an angle established by spring seat and an internal surface of the hub nut is approximately 90 degrees.

14. The method of claim 11, wherein the biasing component is configured to provide a force of at least 350 PSI to the shoulder of the insulating rod when the hub nut is tightened to the predetermined toque.

15. The method of claim 11, wherein the predetermined toque is at least 50 ft/lb.

16. The method of claim 11, wherein a distance between the spring seat and a distal starting position of the thread on the hub nut is greater than a longitudinal extent of the biasing component when the biasing component is in a fully compressed configuration.

* * * * *